United States Patent
Schook

(10) Patent No.: US 8,852,323 B2
(45) Date of Patent: Oct. 7, 2014

(54) DEVICE FOR SEPARATING INTO FRACTIONS A FLUID COMPRISING SEVERAL FRACTIONS WITH DOUBLE SEPARATION

(75) Inventor: Robert Schook, Steenderen (NL)

(73) Assignee: Advanced Technologies & Innovations B. V., Arnhem (NL)

( * ) Notice: Subject to any disclaimer, the term of this patent is extended or adjusted under 35 U.S.C. 154(b) by 359 days.

(21) Appl. No.: 13/262,262

(22) PCT Filed: Apr. 2, 2010

(86) PCT No.: PCT/NL2010/050172
§ 371 (c)(1),
(2), (4) Date: Jan. 17, 2012

(87) PCT Pub. No.: WO2010/114377
PCT Pub. Date: Oct. 7, 2010

(65) Prior Publication Data
US 2012/0111196 A1    May 10, 2012

(30) Foreign Application Priority Data
Apr. 3, 2009    (NL) ........................... 2002714

(51) Int. Cl.
*B01D 45/16* (2006.01)
*B01D 17/02* (2006.01)
*B04C 3/06* (2006.01)

(52) U.S. Cl.
CPC .............. *B01D 17/0217* (2013.01); *B04C 3/06* (2013.01); *B01D 45/16* (2013.01)

USPC .................. 95/271; 55/396; 55/423; 55/456; 55/457

(58) Field of Classification Search
CPC ....... B01D 45/16; B01D 17/0217; B04C 3/06
USPC .................. 55/345, 414, 447, 452–458, 461; 95/269–271; 137/123, 787, 799, 806; 210/172
See application file for complete search history.

(56) References Cited

U.S. PATENT DOCUMENTS

| 3,641,745 A |   | 2/1972 | Moore |
| 3,885,935 A | * | 5/1975 | Nutter .............................. 55/457 |
| 4,008,059 A | * | 2/1977 | Monson et al. .................. 55/396 |
| 4,261,708 A | * | 4/1981 | Gallagher ........................ 95/270 |

(Continued)

FOREIGN PATENT DOCUMENTS

| EP | 0776686 A1 | 6/1997 |
| FR | 2111500 | 6/1972 |

*Primary Examiner* — Duane Smith
*Assistant Examiner* — Sonji Turner
(74) *Attorney, Agent, or Firm* — The Webb Law Firm, P.C.

(57) ABSTRACT

The invention relates to a device for separating a flowing liquid into at least two fractions with differing mass density, comprising: a main tube in the form of a cylinder jacket and having an infeed opening and an outfeed opening; a first swirl element arranged in the main tube for imparting a rotating movement to the fluid flowing through the main tube; a first auxiliary tube placed in the main tube at a distance from the first swirl element; and first discharge means connecting to the jacket of the main tube for discharging a heavier fraction of the fluid. The invention also relates to a method for separating into fractions a fluid comprising several fractions.

18 Claims, 2 Drawing Sheets

(56) References Cited

U.S. PATENT DOCUMENTS

| | | |
|---|---|---|
| 4,299,611 A | 11/1981 | Penberthy |
| 4,478,712 A | 10/1984 | Arnaudeau |
| 6,752,845 B2 * | 6/2004 | Haland ................... 55/340 |
| 2002/0174773 A1 | 11/2002 | Cheng |
| 2003/0159412 A1 | 8/2003 | North |

* cited by examiner

DEVICE FOR SEPARATING INTO FRACTIONS A FLUID COMPRISING SEVERAL FRACTIONS WITH DOUBLE SEPARATION

BACKGROUND OF THE INVENTION

1) Field of the Invention

The invention relates to a device for separating a flowing fluid into at least two fractions with differing mass density, comprising: a main tube substantially in the form of a cylinder jacket and having an infeed opening and an outfeed opening located at the opposite outer end; a first swirl element arranged in the main tube in the vicinity of the infeed opening for imparting a rotating movement to the fluid flowing through the main tube; a first auxiliary tube placed concentrically in the main tube at a distance from the first swirl element and leading to the outfeed opening of the main tube; and first discharge means connecting to the jacket of the main tube for discharging a heavier fraction of the fluid. The rotating movement is imparted to the flowing fluid by means of a swirl element which is usually provided with a plurality of blades, the vane angle of which increases in the flow direction.

2) Description of the Prior Art

Such a separating device is known from U.S. Pat. No. 3,641,745 and from U.S. Pat. No. 4,478,712.

In the prior art according U.S. Pat. No. 3,641,745 a device is disclosed for separating into fractions a gas-liquid mixture in at least two fractions (see title). The device comprises a cylindrical main tube provided with an inlet and an outlet located on the opposite end walls of the main tube. In the main tube close to the inlet a first swirl element (deflector with vanes) is located to make the fluid to be separated swirl. The device is also provided with an additional tube located coaxial in the main tube on a distance of the first swirl element, which additional tube leads to the outlet of the main tube. On the shell of the main tube connect outlet means that lead in a vertical direction for leading a heavier fraction of the fluid away. In the additional tube a second swirl element is located to impart to the additional tube flowing fluid a swirling movement. The outlet shaped as a tube may be considered as a second additional tube that connects coaxial to and in a distance of the second swirl element. On the shell of the first additional tube connect second outlet means for leading away a heavier fraction if the fluid (perforations in the connection to the drain).

It is noted by the way that U.S. Pat. No. 4,299,611 also shows a separating device provided with two separating members. This is however a separating device for removing or filtering particular material from an airflow, and not a device for separating random fluids, more particularly for separating a liquid and a gas fraction. Although the advantages of the invention are manifest with fluids of random nature, an important field of application for the invention lies in the separation of a lighter fraction of the fluid substantially comprising gas from a heavier fraction of the fluid substantially comprising liquid.

The object of the invention is to provide a device which provides for a better separation.

SUMMARY OF THE INVENTION

The invention provides for this purpose a device for separating a flowing fluid into at least two fractions with differing mass density. The device can additionally be provided with means, for instance a pump, for causing the fluid for separating into fractions to flow in axial direction through a main tube. A second swirl element has an entry angle smaller than the exit angle of a first swirl element. Thus, the forces that are exerted due to the rotation of the fluid and thus the separation properties of both the separation steps may be controlled independent of each other. This enlarged freedom of design enables to optimise the total separation result. So the forces generated by the rotation movement of the fluid, and thereby the separating capacity, at the second separating unit may be made as equal as possible to those of the first separating unit.

These measures provide an additional discharge, thus decreasing the chance of insufficient discharge of the heavier fraction. The space of the blind part between the main tube and a second auxiliary tube can also be much larger because the second auxiliary tube is much thinner than a first auxiliary tube, and more space thus results. Another reason is that a first separation has already taken place and that the heavier fraction separated in the first separation has for the greater part already been discharged. Via the walls of the main tube only a small quantity of the heavier fraction will therefore be fed to the final, blind part of the main tube. The fluid fed to the second separation is lighter because (at least a part of) the heavier fraction has been removed and the remaining fluid is thus formed by the lighter fraction from the first separation. The heavier fraction resulting from the first separation is therefore of limited magnitude. The danger of the blind part of the space between main tube and second auxiliary tube becoming full, and thereby the danger of the heavier fraction entering the interior of the second auxiliary tube, is greatly reduced.

Two individual separation steps also take place, this greatly enhancing the quality of the separation.

The invention likewise provides a method for separating into fractions a fluid comprising several fractions, comprising the steps of a first swirl element placed in a main tube imparting a rotating movement to the fluid flowing through the main tube, separating the fluid into a heavier fraction of the fluid located on the wall of the main tube and a centrally located lighter fraction through a first auxiliary tube extending concentrically to the main tube, and discharging the heavier fraction laterally out of the main tube, a second swirl element placed in the first auxiliary tube imparting a rotating movement to the lighter fraction flowing through the first auxiliary tube, separating the lighter fraction into a heavier component of the lighter fraction located on the wall of the auxiliary tube and a centrally located lighter component of the lighter fraction through a second auxiliary tube extending concentrically to the first auxiliary tube, and discharging the heavier component of the lighter fraction laterally out of the first auxiliary tube.

An attractive and simple construction for discharging the heavier fraction resulting from the second separation is obtained when the first auxiliary tube is placed at a distance from the outfeed opening, and when the second discharge means connect to the main tube between the first auxiliary tube and the outfeed opening.

A static mixer can be mounted upstream of the first swirl element. This mixer prevents a so-called stratified fluid being fed to the first swirl element, and the fluid reaches the first swirl element as a homogenous mixture.

The first swirl element causes a rotating movement of the fluid exiting therefrom with a pitch defined by the swirl element. For reasons of flow technique it is attractive, in order to prevent disruptions in the flow pattern, that this movement can be continued during entry into the second swirl element.

This is implemented when the first swirl element has an exit angle substantially corresponding to the entry angle of the second swirl element.

The fluid will usually enter the separating device according to the invention with an axial flow. In order to disrupt the flow pattern as little as possible during entry into the first swirl element, it is attractive for the first swirl element to have an entry angle equal to 0.

A structurally attractive embodiment provides the measure that at least one radially extending support element is arranged between the first auxiliary tube and the main tube. This support element thus positions the first auxiliary tube inside the main tube.

The heavier fraction from the first separation process will come to lie between the first auxiliary tube and the main tube. The major part thereof will be discharged via the first discharge tube, but it is necessary to take into account that a part of this heavier fraction will come to lie in the part located downstream of the first discharge tube. In order to prevent the heavier fraction accumulating there and entering the interior of the first auxiliary tube, it is attractive that axially extending openings are arranged in the at least one support element. The heavier fraction can then be discharged through these openings.

In order to ensure a good fixation of the auxiliary tube in the main tube, the auxiliary tube will have to be supported over a certain axial length. Although it is possible in principle to apply two support elements, it is recommended from a structural viewpoint that the support element extends over a certain axial distance.

In order to allow the discharge of the heavier fraction to take place as easily as possible, it is recommended that the first and the second discharge means comprise respectively a first and a second discharge tube, each extending in a direction with a vertical component.

A structurally attractive embodiment provides the measure that the first discharge tube is at least partially formed by a first T-piece which also forms part of the main tube, that the second discharge tube is at least partially formed by a second T-piece also forming part of the main tube, that the first T-piece is connected to a tube part extending upstream of the T-piece and forming part of the main tube, and the first and the second T-pieces are connected by the support element.

The positioning of the second inner tube is also greatly simplified when at least one radially extending support element, which closes the main tube downstream, is arranged between the second auxiliary tube and the second T-piece.

The process taking place in the separating device becomes better controllable when valves are placed in both discharge tubes for the purpose of maintaining a liquid level in the relevant discharge tube, and that both valves are adjustable. It is also possible to envisage integrating a level controller in one or both discharge tubes such that a determined liquid level can be maintained in the discharge tube(s).

If both discharge tubes are connected downstream, the liquid levels can be adjusted automatically in both tubes (as in communicating vessels). There will hereby be a natural equilibrium in the pressures occurring respectively at the beginning of the first auxiliary tube and in the space between the first auxiliary tube and the main tube. It is thus possible to prevent too much heavy (already separated) fraction being suctioned into the first auxiliary tube. This is because the pressure equilibrium prevents too high an underpressure occurring in the first auxiliary tube. It is also possible to now control the liquid levels with only a single valve.

It is further also advantageous for the first discharge to be provided with a return conduit extending from the first discharge tube and debouching at a location axially in the main tube shortly before the second swirl element. The return conduit makes it possible to subject a lighter component present in the heavier fraction discharged to the first discharge tube to a renewed separating process. A further improvement in efficiency can thus be obtained.

The separation can also be improved when the first and/or second discharge tube is connected above the liquid level to an auxiliary feed tube which ends in the main tube downstream of the second swirl element. This auxiliary feed tube preferably runs through the centre of the first swirl element, and the feedback of a part of the light fraction hereby takes place, this in a manner such that the fed-back lighter fraction has a lateral flow component whereby the fed-back lighter fraction is properly entrained by the fluid rotating in the first auxiliary tube. A kind of feedback is hereby obtained which once again subjects the possibly insufficiently separated fluid to the separating process.

The processes taking place in the separating device likewise become better controllable when the passage of the openings arranged in the support element is adjustable.

BRIEF DESCRIPTION OF THE DRAWINGS

The invention will be further elucidated hereinbelow on the basis of the non-limitative exemplary embodiments shown in the following figures. Herein.

DETAILED DESCRIPTION OF THE PREFERRED EMBODIMENTS

Figure 1:
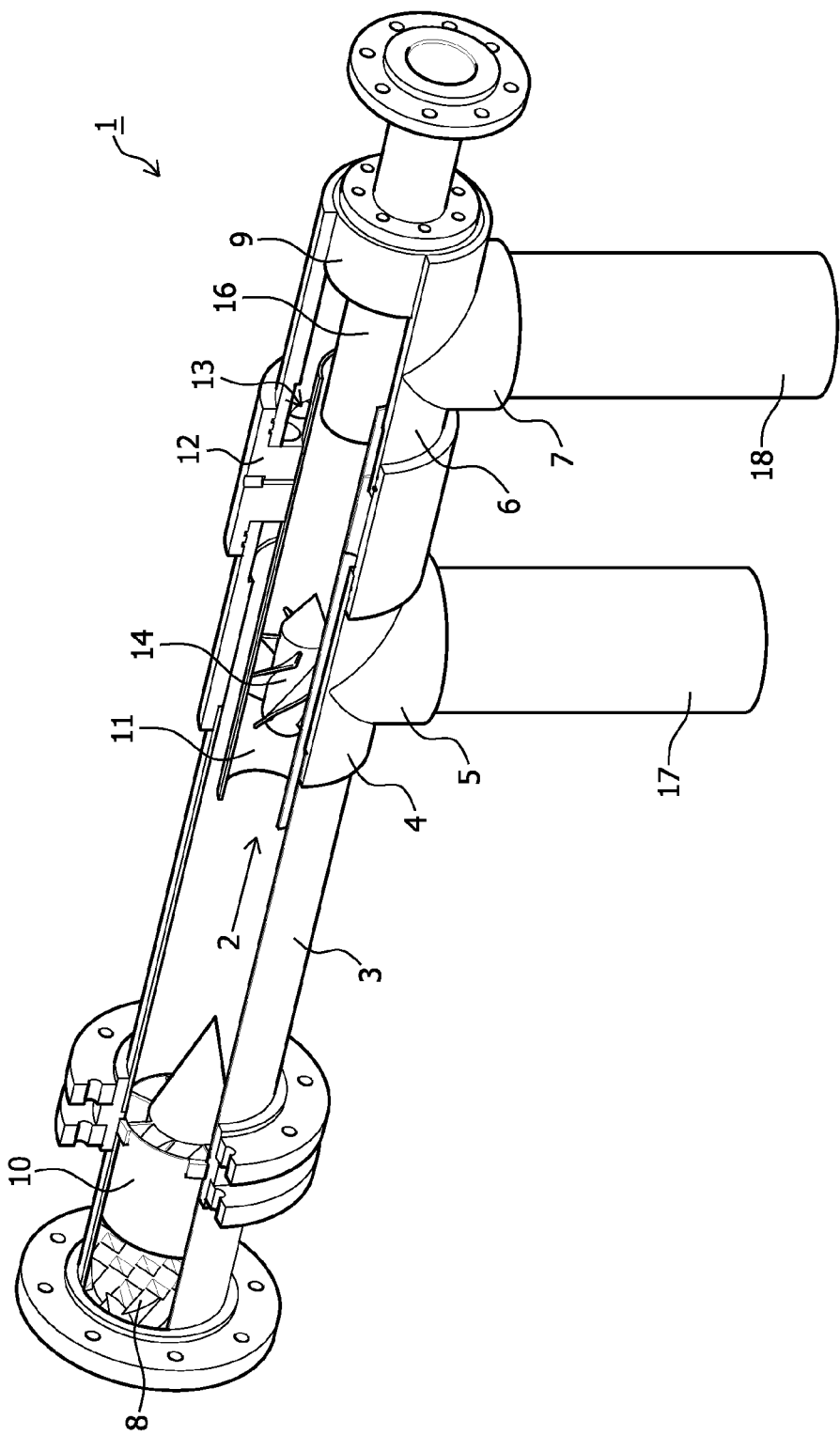
FIG. 1 is a schematic, partially broken-away perspective view of an embodiment of a separating device according to the invention.

Both figures show a separating device, designated in its entirety with 1. Device 1 comprises a substantially cylindrical main tube 2 which is enclosed by a jacket 3, a transverse part 4 of a first T-piece 5 and a transverse part 6 of a second T-piece 7. The embodiments shown here relate to a cylindrical main tube 2; the use of a conical main tube is however by no means precluded. Cylindrical main tube 2 leads from an infeed opening 8 to a closing plug 9. A static mixer can be placed at the beginning of the main tube. Placed in main tube 2 is a first swirl element 10 as well as a first auxiliary tube 11. This first auxiliary tube 11 extends concentrically to cylindrical main tube 2. First auxiliary tube 11 is connected by means of a substantially annular fixing element 12 to both transverse parts 4, 6 of T-pieces 5, 7. Axially extending openings 13 are arranged in fixing element 12, although these could also be for instance blades or vanes. The passage of openings 13 is preferably adjustable here. A second swirl element 14 is arranged in first auxiliary tube 11. Finally, an opening is arranged in closing plug 9 through which a second auxiliary tube 16 runs concentrically to cylindrical main tube 2. The diameter of second auxiliary tube 16 is smaller than that of first auxiliary tube 11, and second auxiliary tube 16 extends over a distance inside first auxiliary tube 11. A first discharge tube 17 and a second discharge tube 18 are arranged connecting respectively to the two T-pieces 5, 7. The two discharge tubes 17 and 18 can join together downstream to form a single general discharge tube (not shown) for combined discharge of a single heavy fraction. Also shown in FIG. 1 are diverse fixing and connecting elements which relate to structural details and which can be freely varied within the context of the invention and are not further elucidated here.

The operation of the device will now be elucidated.

A fluid for separating into a heavier and a lighter fraction is supplied to infeed opening 8 of device 1. Use can for instance be made here of an externally placed pump, although it is for instance also possible, assuming a fluid with a density greater than that of air, for use to be made of gravitational force and/or pressure present in the system for the purpose of supplying the fluid. The axial direction of device 1 can also extend with a vertical component. Once the fluid has passed through an optional static mixer, it passes through first swirl element 10, where a rotation component is imparted to the substantially axial movement of the fluid. The fluid leaving first swirl element 10 hereby acquires a rotating movement. The fluid is thus subjected to centrifugal forces which result in separation of the heavier and lighter fraction of the fluid. The heavier fraction will here accumulate against the wall of jacket 3 and the lighter fraction will accumulate in the centre of jacket 3.

First auxiliary tube 11 will then perform a separation between the lighter fraction and the heavier fraction. The heavier fraction will continue the movement along the inner wall of jacket 3 and flow against a fixing element 12. The greater part of the fraction will leave device 1 via first discharge tube 17. The lighter fraction moves on inside first auxiliary tube 11 and there flows against second swirl element 14, whereby the speed of the rotating movement will increase. Second swirl element 14 is provided on its entry side with a swirl angle smaller than that on the exit side of first swirl element 10. The lighter fraction also undergoes centrifugal forces inside first auxiliary tube 11, as a result of which a further separation occurs into a heavier component of the lighter fraction and a lighter component of the lighter fraction. The heavier component accumulates against the inner wall of first auxiliary tube 11 and, after reaching the end of first auxiliary tube 11, enters a space bounded by inner wall 6 of second T-piece 7, end plug 9 and the outer wall of second auxiliary tube 16. The heavier component will therefore leave this space through second discharge tube 18. The lighter component enters second auxiliary tube 16 and leaves the device through this second auxiliary tube 16.

It is pointed out that a part of the fraction resulting from the first separation process can possibly move through openings 13 in fixing element 12 and will enter the space bounded by inner wall 6 of second T-piece 7, end plug 9 and the outer wall of second auxiliary tube 16. This fraction will be discharged together with the heavier component of the lighter fraction through second discharge tube 18. The optional openings 13 can provide for the correct pressure equilibrium in the system.

The above described process partly depends on conditions prevailing in device 1, including the pressure prevailing in discharge tubes 17 and 18. Although device 1 can in principle be used to separate fractions from the fluid in which the difference in density is sufficient, an important field of application lies in the separation of gases and liquids. The heavier fraction formed by liquids is then discharged via discharge tubes 17 and 18. In order to enable control of the pressures prevailing in discharge tubes 17, 18 it is desirable to control the liquid level in discharge tubes 17, 18. Valves (or optionally level controllers) 21 and 22 are arranged for this purpose in discharge tubes 17, 18. Alternatively, it is also possible for discharge tubes 17, 18 to join together and to be operated by means of one valve and/or level controller. The advantage hereof is that a controlled pressure equilibrium occurs at the beginning of auxiliary tube 11, thus preventing the heavy fraction that has already been separated from being entrained again in the first auxiliary tube.

Pressure difference gauges P1, P2 and P3 can also be arranged which measure the pressure difference over respectively first swirl element 10, second swirl element 14 and fixing element 12. Using the thus obtained measurement data it is possible to acquire insight into the processes in device 1, and settings of device 1, such as for instance the passage of openings 13 and valves/level controllers 21, 22, can be regulated. It is also possible to apply level control to discharge tubes 17 and/or 18 so that a liquid trap is obtained.

Figure 2:
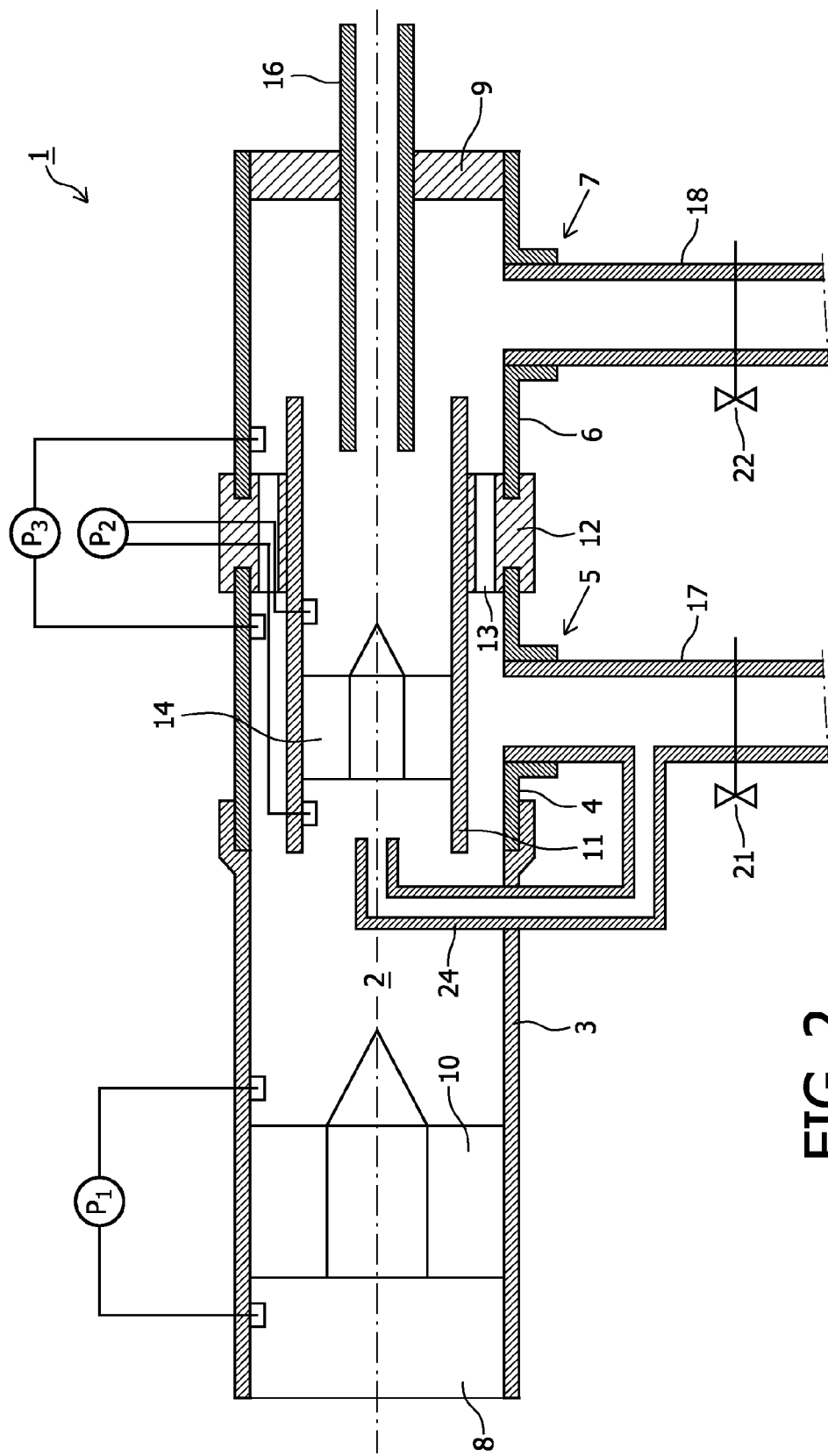
FIG. 2 is a schematic view of a section through an alternative embodiment of a separating device according to the invention.

Finally, FIG. 2 shows the measure that a return conduit 24 extends from first discharge tube 17 to a location shortly before second swirl element 14. It is hereby possible for a lighter component present in the heavier fraction discharged to first discharge tube 17 to be once again subjected to a separating process, so as to thus further improve the degree of separation.

It is alternatively also possible to envisage a return conduit being connected to one or both of the discharge tubes 17, 18, which return conduit protrudes on the opposite side through the first and/or second swirl. Such a return conduit ensures that a part of the light fraction is fed back to the separating device. This feedback preferably takes place through the centre of the first and/or second swirl element 10, 14 into the rotating flow of fluid at the position where the pressure is lowest. It is also advantageous to have this "recycle" flow take place laterally downstream of the first and/or second swirl element 10, 14.

The invention claimed is:

1. A device for separating a flowing fluid into at least two fractions with differing mass density, comprising:
   a main tube substantially in the form of a cylinder jacket and having an infeed opening and an outfeed opening located at the opposite outer end;
   a first swirl element arranged in the main tube in the vicinity of the infeed opening for imparting a rotating movement to the fluid flowing through the main tube;
   a first auxiliary tube placed concentrically in the main tube at a distance from the first swirl element and leading to the outfeed opening of the main tube; and
   first discharge means connecting to the jacket of the main tube for discharging a heavier fraction of the fluid;
   wherein:
   a second swirl element placed in the first auxiliary tube in the vicinity of the infeed opening for imparting a rotating movement to the fluid flowing through the first auxiliary tube;
   a second auxiliary tube placed concentrically in the first auxiliary tube at a distance from the second swirl element and leading to the outfeed opening of the main tube; and
   second discharge means connecting to the jacket of the main tube for discharging a heavier fraction of the fluid, wherein the first swirl element has an exit swirl angle greater than the effective entry swirl angle of the second swirl element.

2. The device as claimed in claim 1, wherein the heavier fractions of the fluid substantially comprise a liquid, and a lighter fraction, which is separated from the heavier fractions and substantially comprises a gas.

3. The device as claimed in claim 1, wherein the first auxiliary tube is placed at a distance from the outfeed opening, and that the second discharge means connect to the main tube between the first auxiliary tube and the outfeed opening.

4. The device as claimed in claim 1, wherein a mixer is placed upstream of the first swirl element.

5. The device as claimed in claim 1, wherein at least one support element is arranged between the first auxiliary tube and the main tube.

6. The device as claimed in claim 5, wherein axially extending openings are arranged in the at least one support element.

7. The device as claimed in claim 5, wherein the support element extends over a certain axial distance.

8. The device as claimed in claim 1, wherein the first and the second discharge means comprise respectively a first and a second discharge tube, each extending downward in a direction with a vertical component.

9. The device as claimed in claim 8, wherein the first discharge tube comprises a first T-piece which also forms part of the main tube, that the second discharge tube comprises a second T-piece also forming part of the main tube, that the first T-piece is connected to a tube part extending upstream of the T-piece and forming part of the main tube, and the first and the second T-pieces are connected by the support element.

10. The device as claimed in claim 1, wherein at least one radially extending support element, which closes the main tube downstream, is arranged between the second auxiliary tube and the second T-piece.

11. The device as claimed in claim 1, wherein the first and the second discharge means comprise respectively a first and a second discharge tube and wherein valves are placed in both discharge tubes for the purpose of maintaining a liquid level in at least one discharge tube, and that both valves are adjustable.

12. The device as claimed in claim 1, wherein the first and second discharge means are connected to each other for the purpose of pressure equalization between the first and second discharge means.

13. The device as claimed in claim 12, wherein the first and second discharge means transpose into a shared discharge provided with a single valve for the purpose of regulating a liquid level in both the first and the second discharge means.

14. The device as claimed in claim 11, wherein at least one of the discharge means is connected above the liquid level to an auxiliary feed tube which ends in the main tube downstream of the second swirl element.

15. The device as claimed in claim 14, wherein the auxiliary feed tube runs through the centre of the first swirl element so as to thus feed a part of the light fraction from the discharge means back to the infeed opening.

16. The device as claimed in claim 5, wherein the passage of the openings arranged in the support element is adjustable.

17. A method for separating into fractions a fluid comprising several fractions, comprising the steps of:
   placing a first swirl element in a main tube to impart a rotating movement to the fluid flowing through the main tube;
   separating the fluid into a heavier fraction of the fluid located on the wall of the main tube and a centrally located lighter fraction through a first auxiliary tube extending concentrically to the main tube; and
   discharging the heavier fraction laterally out of the main tube,
   placing a second swirl element in the first auxiliary tube to impart a rotating movement to the lighter fraction flowing through the first auxiliary tube;
   separating the lighter fraction into a heavier component of the lighter fraction located on the wall of the first auxiliary tube and a centrally located lighter component of the lighter fraction through a second auxiliary tube extending concentrically to the first auxiliary tube; and
   discharging the heavier component of the lighter fraction laterally out of the first auxiliary tub;
   wherein the first swirl element has an exit swirl angle greater than the effective entry swirl angle of the second swirl element.

18. The method as claimed in claim 17, wherein the heavier component of the lighter fraction is brought together with at least a part of the heavier fraction.

* * * * *